United States Patent [19]

Kerekes

[11] Patent Number: 4,474,841
[45] Date of Patent: Oct. 2, 1984

[54] HEAT-RADIANT PAPER LAMINATE PANEL AND METHOD OF FORMING

[76] Inventor: Peter S. Kerekes, 134 Kirk Dr., Thornhill, Ontario, Canada, L3T 3L4

[21] Appl. No.: 537,959

[22] Filed: Sep. 30, 1983

[51] Int. Cl.³ .................... B32B 3/00; B32B 23/08
[52] U.S. Cl. .................... 428/78; 156/307.4; 219/553; 428/236; 428/530; 428/531; 428/537.5; 428/322.2
[58] Field of Search .......... 428/78, 236, 530, 531, 428/537; 156/285, 272

[56] References Cited

U.S. PATENT DOCUMENTS 4,343,850  8/1982  Kravig et al. .................... 428/530

Primary Examiner—Marion E. McCamish

[57] ABSTRACT

An easily stackable, heat-radiant, self-supported, rigid, high-pressure, decorative paper base laminate panel having numerous applications is disclosed. The panel comprises a heat-radiant porous fabric including electrically conductive strips. The fabric is sandwiched between a plurality of sheets of paper which have been impregnated with suitable thermosetting resins as to form a unitary decorative panel upon heat-pressing. However, the sheets next to the fabric, are treated with an excess of resin. The thickness and the distribution of the papers in the laminate are all important. When a suitable voltage is applied through the conductive strips the decorative panel radiates heat.

11 Claims, 5 Drawing Figures

HEAT-RADIANT PAPER LAMINATE PANEL AND METHOD OF FORMING

FIELD OF THE INVENTION

This invention relates to heat-radiant, self-supported, rigid, decorative high-pressure paper base laminate forming a unitary panel. More particularly this invention relates to a decorative paper laminate panel having sandwiched therein, a porous fabric having an electrical resistive material deposited thereon, and to a simple method of making the same.

BACKGROUND OF THE INVENTION

High pressure decorative laminates are known. They are generally produced by stacking and curing under heat and pressure a plurality of layers of paper, impregnated with various synthetic thermosetting resins.

As far as the inventors are aware, there are no self-supported paper based decorative high pressure laminate panels which could be used as a heating panel nor are there processes for economically making these products.

An electric heating assembly for use with a source of electrical power and comprising in combination a panel construction including a heat film panel and facing material on at least one side thereof, with means to secure said panels together in laminated relationship, has been described in Canadian Pat. No. 1,096,919 dated March 81, as invented by Bender. The laminates disclosed in the patent, are wood, metal, plastic, plaster board.

Also Canadian Pat. No. 903,818 dated June 1972, as invented by MacGuire, discloses an electric heating panel comprising an electric heating element fixed within a homogeneous unitary body of a thermo-setting resin having an inert filler. Other types which are less relevant to the subject of this invention include Canadian Pat. No. 706,488 as invented by Ford et al; Canadian Pat. No. 970,816 as invented by MacGuire, Canadian Pat. No. 1,136,194 as invented by Harold.

Electric heating devices located between flexible material sheets are also known and have been described by the inventor Paul Eisler, in U.S. Pat. No. 3,522,415 dated Aug. 4, 1970.

The same inventor has also described other systems:
—U.S. Pat. No. 3,510,547 dated May 5, 1970 consists in an electric heating element in a mold structure. - U.S. Pat. No. 3,546,432 dated Dec. 8, 1970 is directed to a wall covering material for use in heating space. - U.S. Pat. No. 3,544,762 dated Dec. 1, 1970, is directed to a method of positioning a dispensable electric heating film. U.S. Pat. 3,539,767 dated Nov. 10, 1970, describes a heating film disposed between two layers, one of which is a floor or a wall covering, and the film being bonded to one of the layers and having at least one of the layers composed of a material supplied in roll form.

U.S. Pat. No. 3,721,800 dated Mar. 20, 1978, is directed to a heating film between two layers one of which being a material supplied in roll form.

U.S. Pat. No. 3,567,353 dated Mar. 2, 1971 is directed to walls covered with a detachable material having passages for a heat exchange medium, or incorporating an electric heating film.

U.S. Pat. No. 3,539,768 dated Nov. 10, 1970, discloses a heating film covering a major portion of the walls of a plurality of rooms, the film being spaced from the walls by means of inflatable insulation.

U.S. Pat. No. 3,751,629 Aug. 7, 1978 is directed to a mobile surface heater.

Other known patents which are believed even less relevant, include:
U.S. Pat. No. 3,089,017 dated May 7, 1963;
U.S. Pat. No. 3,897,928 dated Aug. 5, 1975;
U.S. Pat. No. 3,846,204 dated Nov. 5, 1974;
U.S. Pat. No. 3,751,629 dated Aug. 7, 1973.

All these are directed to structures which are either flexible, or are weakened by heating elements or are heavier because of such elements. In other words, products are known where the heating elements impair the structures by rendering them heavier, weaker, or cumbersome or more difficult to manufacture and to handle during shipping.

Also apparently fibreglass has been used to support electrically heated structure. However, such a system is time consuming the fibreglass is added in layers by hand, each layer requiring to be dryed before adding the next one, and also fibreglass is expensive.

BRIEF DESCRIPTION OF THE INVENTION

Broadly stated the invention is directed to an easily stakable, heat-radiant, self-supported, rigid, high-pressure, decorative paper laminate panel comprising: a suitable electrically operable heat-radiant porous fabric, said fabric including strip means for electrically connecting said fabric, said porous fabric including said strip means being sandwiched in between a plurality of sheets of paper, said sheets of paper being impregnated with a thermosetting resin, wherein adjacent said porous fabric and at least the first sheet of paper, on each side of said fabric an additional amount of thermosetting resin is present, and wherein said first sheets of papers adjacent said porous fabrics contain at least one part by weight of resin per part of paper and that said sheets of paper are selected as to number to define a laminate having a thickness of at least 1/10 of an inch and preferably at least ⅛ of an inch the strength of said laminate, said number of sheets of paper being divided substantially in equal amount on each side of said porous fabric to allow on each side of said porous fabric substantially equal thermal expansion, said resin being dispersed throughout at least adjacent sheet of papers, and throughout the porous fabric and the sheets of paper adjacent thereto, so as to firmly and permanently bind said sheets of paper to said porous fabric including said strip means, to form a unitary self supporting laminated panel, and on at least one side of said porous fabric, the far most sheet of said sheets of paper, from said porous fabric being provided with a decorative surface on its face, said thermosetting, resin maintaining its binding characteristics under the heat to be created by said porous fabric, and said porous fabric being selected so that the heat generated in the fabric is below that which would weaken the binding characteristics of said thermosetting resin, said fabric including said strip means being confined within the boundaries of said sheets of paper and being sealed therein.

By "easily stackable" as found throughout the disclosure and claims, is meant that panels can be easily laid on top of the other as ordinary panels.

In a preferred embodiment the laminate has a decorative surface on both sides.

The invention is also directed to a method for the manufacture of a heat radiant high-pressure plastic laminated panel on a laminate assembly line, comprising; assembling in a stack from the bottom up, a first polished caul plate, a decorative sheet selected from the class consisting of: (a) decorative coloured sheet impregnated with a thermosetting resin and (b) a thin alpha cellulose print paper sheet impregnated with a high thermosetting resin content to protect the underlying resin impregnated print paper, a first given number of sheets of paper impregnated with a thermosetting resin, a first set of at least another sheet of paper carrying on an additional amount of thermosetting resin, an electrically operable heat-radiant porous fabric having electrically conducting strips means, said fabric including said strip means being in recess of said sheets of paper to define a margin where the laminate to be, will be free from said fabric, another set, similar to said first set of at least another sheet of paper carrying on an additional amount of a thermosetting resin, another number of paper impregnated with a thermosetting resin substantially identical to said first number, with or without another decorative paper selected from the class as defined hereinabove, and completing with a second polished caul plate; heat pressing said stack assembly under pressure and temperatures for a period of time sufficient to obtain a unitary panel, then cooling said stack assembly under pressure.

The present invention is directed to an inexpensive laminated heating panel which may be used in general construction without impairing its usual decorative laminate characteristics: such a laminate panel possesses substantially the same physical tensile and compression properties that it would have without that heating elements. The invention aims to avoid the problems generally associated with the presence of such heating element and including such defects as laminate bending or warping or splitting. In general the laminate is stronger than wood, has great abrasive resistance, and it has a decorative surface which is easy for maintenance.

In a preferred embodiment the invention is directed to a prefabricated structure having indoor and protected outdoor applications. It may be conveniently used in the inside of an outdoor shelter, such as a bus stop shelter or a toll booth. All electrical connections can be hidden, thereby reducing risk of vandalism.

The invention aims also at economically producing such heat-radiant laminates with the minimal changes in a conventional laminate production line, thereby offering ease of production and reducing production costs to a minimum, while enabling simultaneously the production carrying of regular laminate on the same production line.

This invention further aims at producing a strong self supporting heat radiant panel which has the dual function of heating and of acting as part of the building.

In another preferred embodiment the laminated panels form parts of modular partitions, as modular work stations, and for other uses some of which to be discussed further on.

DETAILED DESCRIPTION OF THE INVENTION

Referring now to the drawings which illustrate preferred embodiments of carrying out the invention.

Figure 1:
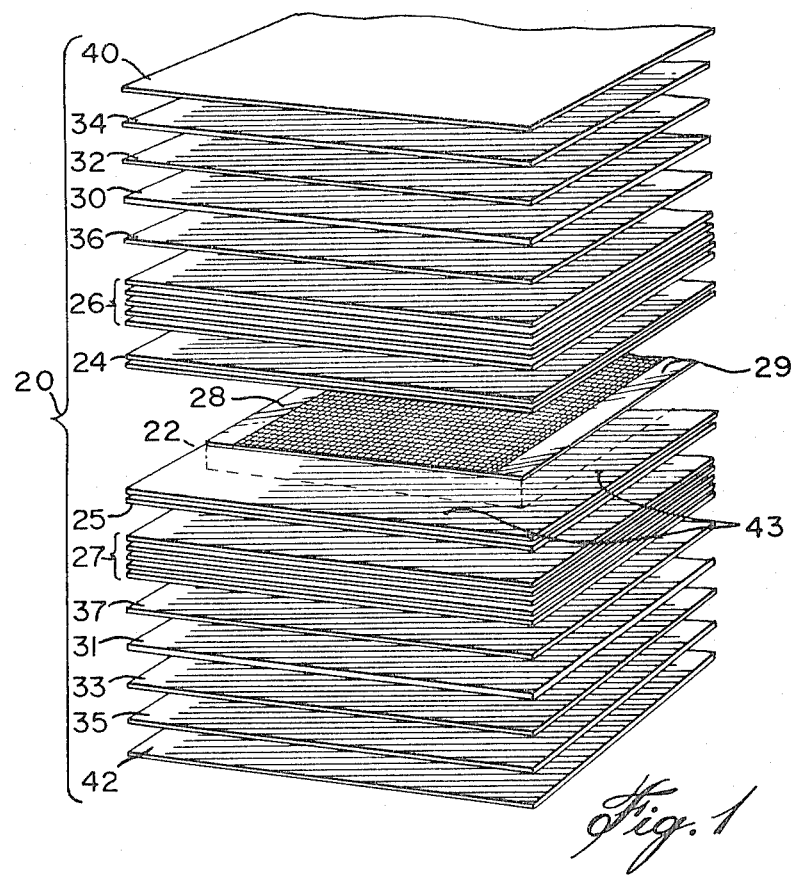
FIG. 1 is an exploded view of a high pressure paper laminate in accordance with an embodiment of the present invention including the caul plates.

Referring now to FIG. 1, the laminated panel 20 consists of a suitably electrically operable heat-radiant porous fabric 22, one of these fabrics being commercially available under the trade mark: "Thermofilm". Each face of the porous fabric 22 is provided with a set 24-25 of two sheets of papers impregnated and coated with melamine resin, and then two sets of plurality of phenolic-resin impregnated kraft paper 26 and 27, usually called corestock, equally distributed on each side of the porous fabric. The porous fabric 22 is itself provided on two of its opposite edges with conductive and connecting strips 28-29. All laminating components in the sets 25 to 42 and 24 to 40 are arranged to cover up and exceed over the porous fabric 22 as well as the connecting strips 28-29 in order to provide electrical insulation and to embed it in said papers 26 and 27, also in order to offer along the periphery of the laminate, a suitable space 43 for riveting, boaring or drilling without coming into contact with said porous fabric. The electric contact are easily made with metal terminals fastened through the panel to the connecting strips 28 and 29. It should be borne in mind that the sets 24 and 25 of melamine coated papers have been found to be a convenient way to provide an efficient glueline, however, instead excess i.e. resin may be added in any other way as long as the thermosetting resin content is high on each side of the porous fabric. Other thermosetting resins may also be used. Finally a decorative sheet of paper 30, 31 is added on each side such as a melamine decorative sheet usually called cover, although it may be added on one side only if desired. A thin melamine resin impregnated paper, usually called overlay, such as melamine overlay sheets 32, 33, may be added. A texturized release sheet 34, 35 may be further added if desired as well as barrier sheets, for instance a phenolic barrier sheet 36, 37.

In general the suitable thermosetting resins which may be used are those that maintain their adhesive properties at the elevated temperature of the panel, that will not melt and that will not affect the porous fabric. Suitable thermosetting resins are for instance phenolic resins melamine, polyester epoxy resins etc.

It has been found also that in order to succeed in the making of such laminate the electrically operable heat-radiant fabric must be porous so that said pores allows the flow of resins through its web, thereby said resin penetrating throughout to firmly bind the fabric to the paper sheets.

It was found that when the fabric is not porous the laminate will have a tendency to blister or separate along a line of weakness produced by the fabric. It has also been found that the thinner is that porous fabric the better is the resulting laminate. Care must be taken in the selection of a suitable heat-radiant fabric which should be as thin as possible. The selected fabric should produce heat when a voltage is applied without affecting the bonding characteristics of the laminating resin. In general the heat generated by the fabric should not exceed 100 watts square foot and preferably be 65 to 75 watts per sq. ft.

The system as described under FIG. 1 may be conveniently sandwiched in between suitable polished pressing plates also called caul plate 40 and 42 and heat-press under suitable temperature and pressures until a unitary panel is obtained followed by cooling under pressure. As a way of example, temperatures in the order of 135°–180° C. and pressures in the order of 700–1400 psi may be used.

Figure 2:
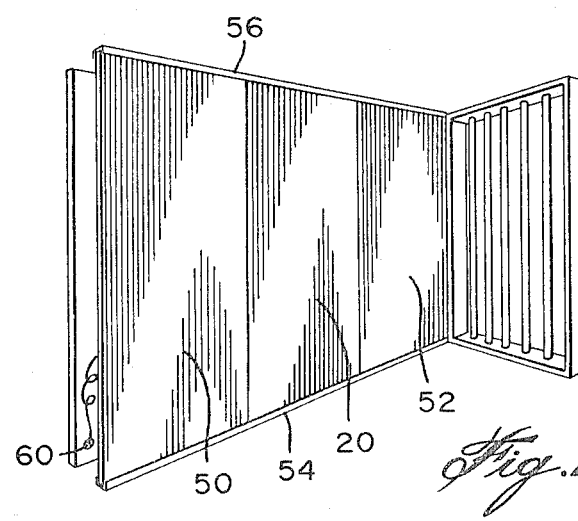
FIG. 2 is a perspective view of a penitentiary cell in a jail also containing heat radiant paper laminate panels.

Referring now to FIG. 2, it can be seen that heat radiant laminated panels 20 may easily be used in combination with regular high pressure laminates, 50–52 as for instance, by sliding through U-shaped extruded channels 54–56. Here the heat radiant median wall panelling structure application is shown in a typical prison cell. The panels may be permanently fixed by means of rivets along the periphery of the panel if desired. The panels 20 which have their surface identical to other laminates can easily be stock-piled and treated as other laminates without any special shipping conditions. These panels can be substituted for conventional laminates and vice-versa. In these constructions, care must be taken that air circulation occurs on each face of the laminated panel 20, to avoid unequal thermal expansion, to favour equal thermal expansion as much as possible on each side of the porous fabric.

When in position, electrical wiring can be connected to the panel by means of terminals 60 at a pre-set distance from the periphery of the laminate and said wires may conveniently be covered up, by fastening commercially available moldings. The wires are operatively connected to suitable power source, and a thermostat may be used if desired, as is well known in the art. The panel being stronger than wood and having a great abrasive resistance makes it a valuable tool for prison as well as for other public areas subject to vandalism.

Figure 3:
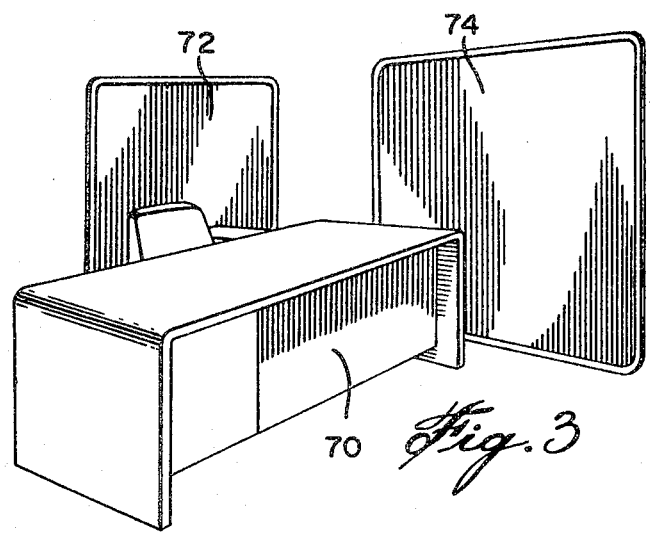
FIG. 3 is a perspective view of a desk and modular partitions containing heat radiant paper laminate panels.

A laminated panel 70 as shown in FIG. 3 was used as modesty panel, in the making of a secretary's desk. Also laminated panels 72 and 74 were used as office partitions for making modular arrangements or for toilet partitions (not shown). As can easily be seen this laminate has numerous applications as permanent architectural structures.

Figure 4:
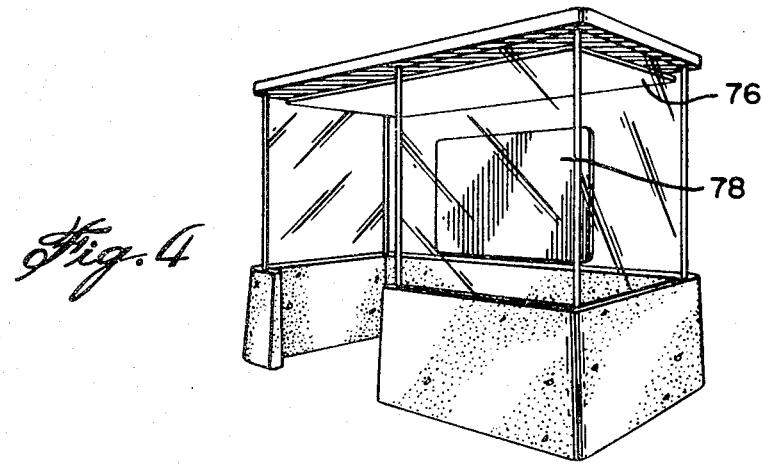
FIG. 4 is a perspective view of a bus stop shelter containing heat radiant paper laminate panels.
Figure 5:
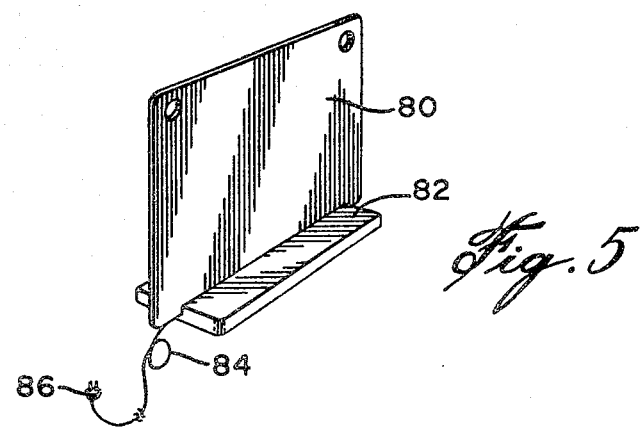
FIG. 5 is a perspective view of a heater.

As shown in FIG. 4, it could be used also as a wall or as a suspended ceiling panel 76, even a door (not shown) or may be disguised as the heat radiant printed map laminate panel 78, depending upon local regulations or simply as on FIG. 5, as a heat-radiant panel 80 mounted on a support 82 provided with a standard electrical wire 84 and a plug 86.

EXAMPLE 1

A system as described under FIG. 1 was conveniently sandwiched in between caul plates and heat pressed at temperatures in the order of 150° C. and pressures in the order of 1000 psi until a unitary panel was obtained followed by cooling under pressure. The porous fabric consisted of a woven inert Fiberglass substrate is impregnated with a mixture of special chemical compounds in order to generate a specific or desired electric resistance; copper contact tapes 28–29 are attached along the edges of the fabric for application of supply voltage.

Two decorative sheet of papers which had been previously impregnated with melamine resins were added to define the faces of the laminate. Surprisingly enough, the porous fabric treated so drastically maintains its heat-radiant characteristics when electrically operated. The panel had a unit weight of about 5–6 lbs./ft.$^2$ for a $\frac{3}{4}''$ thickness or 1.40 to 1.46 g/cm$^3$ and the sheets of paper for making the corestock were generally 100 ∝ 130 lbs./3000 ft.$^2$ although papers of less than 70 lbs./3000 ft.$^2$ may be used, with 30 lbs./3000 ft.$^2$ paper as low as about and as high as 160 lbs./3000 ft.$^2$.

The following sample will serve to illustrate the serious difficulties earlier encountered:

Sample A

The same was repeated as for the laminate in Example 1 but with the porous fabric excentrically positioned. It was found that the laminated panel produced was unsuitable due to bending the more excentric the laminate, the more serious being the problem.

Sample B

The same was repeated as in Example 1, but eliminating the additional amount of resin supplied by means of the two sets of melamine-coated papers 24–25 and using only the kraft papers 26–27 commercially available with a thermosetting resin, for laminating, as is known and practiced in the art. It was found that such laminate has a tendency to split along the porous fabric.

These papers have not more than 40% resin and not less than 60% paper, on a weight basis, and are considered amply satisfactory for laminating purposes. It was found that the sheets next to heat-radiant porous fabric, must contain at least 50% by weight of thermosetting resin and 50% or less paper, and preferably in the order of 2 parts by weight of thermosetting resin per part of paper.

EXAMPLE 2

The same was repeated as in Example 1 making a laminate less than $\frac{1}{2}$ inch, about 1/10 of an inch. It was found that such a laminate curves, and can be used in a sustaining frame, or mounted inside vehicles with an air gap on the back (cars, trains, busses, etc).

It was found that the laminate should be at least $\frac{1}{4}$ inch thick to be used without a mounting frame or support and the laminate may range up to 1 inch or even higher depending upon the needs. With the product already decorated this further reduces client's cost and is another advantage which militates for applicant's product.

Sample C

The same was repeated as for the laminate in Example 2, but with the porous fabric excentrically positioned the laminate rapidly curved.

EXAMPLE 3

The same was repeated as in Example 1 except that the melamine coated papers were replaced with an additional amount of phenolic resin. The resulting product had a lesser tendency to break than Sample B and such laminate was found satisfactory.

Although preferred embodiments of the invention has been illustrated it should be borne in mind that modification of the above will be evident to those skilled in the art without departing from the spirit of the invention as defined in the appended claims.

I claim:

1. An easily stakable, heat-radiant, self-supported, rigid, high-pressure, decorative paper laminate panel comprising: a suitable electrically operable heat-radiant porous fabric, said fabric including strip means for electrically connecting said fabric, said porous fabric including said strip means being sandwiched in between a plurality of sheets of papers, said sheets of paper being impregnated with a thermosetting resin, wherein adjacent said porous fabric and at least the first sheet of paper, on each side of said fabric an additional amount of thermosetting resin is present, and wherein the first sheets of paper adjacent said porous fabric contain at least one part by weight of resin per part of paper, and that said sheets of paper are selected as to the number to define a laminate having a thickness of at least 1/10 of an inch as well as to define the strength of said laminate, said number of sheets of paper being divided substantially in equal amount on each side of said porous fabric to allow on each side of said porous fabric substantially equal thermal expansion, said resin being dispersed throughout at least adjacent sheets of papers, and throughout the porous fabric and the sheets of paper adjacent thereto, so as to firmly and permanently bind said sheets of paper to said porous fabric including said strip means, to form a unitary self-supporting laminated panel, and on at least one side of said porous fabric, the far most sheet of said sheets of paper, from said porous fabric being provided with a decorative surface on its face, said thermosetting resin maintaining its binding characteristics under the heat to be created by said porous fabric, and said porous fabric being selected so that the heat generated in the fabric is below that which would weaken the binding characteristics of said thermosetting resin, said fabric including said strip means, being confined within the boundaries of said sheets of paper and being sealed therein.

2. The heat-radiant laminate as defined in claim 1 wherein said porous fabric is a woven inert substrate impregnated with a product having a preset electrical resistivity and said strip means comprises two strips, one of said strip being positioned on one edge of said fabric and, the other of said strip being positioned on the edge opposite said one edge of said fabric.

3. The heat radiant laminate as defined in claim 1 or 2 wherein said porous fabric is fiberglass with a semi conductive material deposited on it.

4. The heat-radiant laminate as defined in claim 1 or 2 wherein said decorative surface is a melamine member selected from the class consisting of a melamine resin impregnated printed paper having a melamine overlay sheet and a melamine resin impregnated coloured paper.

5. The heat-radiant laminate as defined in claim 1 wherein said sheets of paper are Kraft papers impregnated with a phenolic resin and said resin is not more than 40% by weight of said resin impregnated kraft papers.

6. The heat-radiant laminate as defined in claim 1 wherein the additional amount of thermosetting resin is supplied by additional sheets of paper impregnated with a thermosetting resin member selected from the class consisting of melamine and phenolic resins and where in said resin ranges from 1 to 4 parts by weight of resin per part of paper.

7. The heat-radiant laminate as defined in claim 1, having a density of about 1.40–1.46 g/cm$^3$.

8. The heat radiant laminate as defined in claim 1 wherein the heat dissipable by said porous fabric is less than 200 watts/sq.ft.

9. A method for the manufacture of an easily stakable, heat radiant self-supported, rigid high-pressure, decorative paper laminate panel, on a laminate assembly line, comprising: assembling in a stack from the bottom up, a polished caul plate, a decorative sheet selected from the class consisting of: (a) decorative coloured sheet impregnated with a thermosetting resin, and (b) a thin alpha cellulose print paper sheet impregnated with a high termosetting resin content to protect the underlying resin impregnated print paper, a first given number of sheets of paper impregnated with a thermosetting resin, a first set of at least one sheet of paper carrying on an additional amount of thermosetting resin, an electrically operable heat-radiant porous fabric having conducting strip means, said fabric including said strip means being in recess of said sheets of paper as to define a margin where the laminate to be, will be free from said fabric, another set, similar to said first set of at least another sheet of paper carrying on an additional amount of thermosetting resin, another number of paper impregnated with a thermosetting resin substantially identical to said first number and a second polished plate, heat pressing said stack assembly under pressure and temperatures for a period of time sufficient to obtain a unitary panel then cooling said static assembly under pressure.

10. The method as defined in claim 9 wherein prior to said second polished caul plate, another of said decorative sheet is added.

11. The method as defined in claim 9 or 10 wherein, a texturing release paper is added between the metal pressing plate and the decorative sheet.

* * * * *